(12) United States Patent
Kato et al.

(10) Patent No.: US 7,260,458 B2
(45) Date of Patent: Aug. 21, 2007

(54) STEERING DEVICE

(75) Inventors: Hiroaki Kato, Hekinan (JP); Minekazu Momiyama, Chiryu-shi (JP); Shoji Ogawa, Chiryu-shi (JP); Kenji Asano, Toyota-shi (JP); Yuzou Imoto, Chita-gun (JP); Yoshiyuki Yasui, Nagoya-shi (JP); Wataru Tanaka, Anjo-shi (JP); Eiichi Ono, Toyota-shi (JP); Yuji Muragishi, Nagoya-shi (JP)

(73) Assignees: Jtekt Corporation, Osaka (JP); Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 10/515,178

(22) PCT Filed: May 26, 2003

(86) PCT No.: PCT/JP03/06554
§ 371 (c)(1),
(2), (4) Date: Nov. 26, 2004

(87) PCT Pub. No.: WO03/099635
PCT Pub. Date: Dec. 4, 2003

(65) Prior Publication Data
US 2005/0161279 A1 Jul. 28, 2005

(30) Foreign Application Priority Data
May 27, 2002 (JP) .............................. 2002-153073

(51) Int. Cl.
*G01N 19/02* (2006.01)
*B60T 8/76* (2006.01)
(52) U.S. Cl. .................... 701/41; 180/197; 303/139
(58) Field of Classification Search .................. 701/41, 701/75, 80, 73, 74, 69, 70, 71, 72, 76, 82, 701/84; 180/197, 412, 446; 303/139, 140, 303/145
See application file for complete search history.

(56) References Cited

U.S. PATENT DOCUMENTS 5,004,064 A * 4/1991 Tezuka et al. .............. 180/197
5,172,319 A * 12/1992 Shiraishi et al. .............. 701/90
5,419,624 A * 5/1995 Adler et al. ................. 303/112

(Continued)

FOREIGN PATENT DOCUMENTS

JP        6-206558        7/1994

(Continued)

OTHER PUBLICATIONS

U.S. Appl. No. 10/514,846, filed Nov. 18, 2004, Kato, et al.
U.S. Appl. No. 10/515,178, filed Nov. 26, 2004, Kato, et al.

*Primary Examiner*—Dalena Tran
(74) *Attorney, Agent, or Firm*—Oblon, Spivak, McClelland, Maier & Neustadt, P.C.

(57) ABSTRACT

In a steering apparatus, in accordance with a grip limit control process ($30b'$), it is determined whether or not a grip degree $\epsilon$ estimated by a grip degree estimation arithmetically operating process ($30a$) is less than a predetermined grip degree ($\epsilon'$), and in the case that it is determined that an estimated grip degree ($\epsilon$) is less than the predetermined grip degree ($\epsilon'$), the process applies such a feeling that a steering operation by a steering wheel suddenly becomes light to a driver, by suddenly increasing an assist quantity by a motor (M), thereby notifying the driver of the matter that the grip degree of a steered wheel is close to a limit. Therefore, it is possible to transmit to the driver a probability that a side slip is generated by further turning the steering wheel 21 in the same direction as the current direction, thereby calling the driver's attention for steering. Accordingly, there is an effect that a stability of a vehicle behavior can be improved without applying any fear of insecurity to the driver.

5 Claims, 17 Drawing Sheets

U.S. PATENT DOCUMENTS

| | | | |
|---|---|---|---|
| 5,944,082 A * | 8/1999 | Thompson et al. | 152/209.8 |
| 5,948,961 A * | 9/1999 | Asano et al. | 73/9 |
| 6,155,377 A | 12/2000 | Tokunaga et al. | |
| 6,219,604 B1 * | 4/2001 | Dilger et al. | 701/41 |
| 2002/0011093 A1 * | 1/2002 | Matsuno | 73/9 |

FOREIGN PATENT DOCUMENTS

| | | |
|---|---|---|
| JP | 6-221968 | 8/1994 |
| JP | 07-137647 | 5/1995 |
| JP | 11-11332 | 1/1999 |
| JP | 11-48998 | 2/1999 |
| JP | 11-99956 | 4/1999 |
| JP | 3047762 | 6/2000 |
| JP | 2000-264237 | 9/2000 |
| JP | 3097419 | 10/2000 |

* cited by examiner

Fig.13
(A)
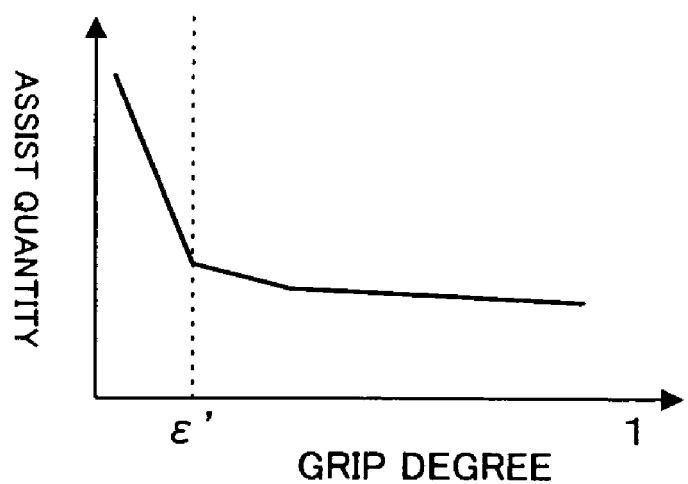
(B)
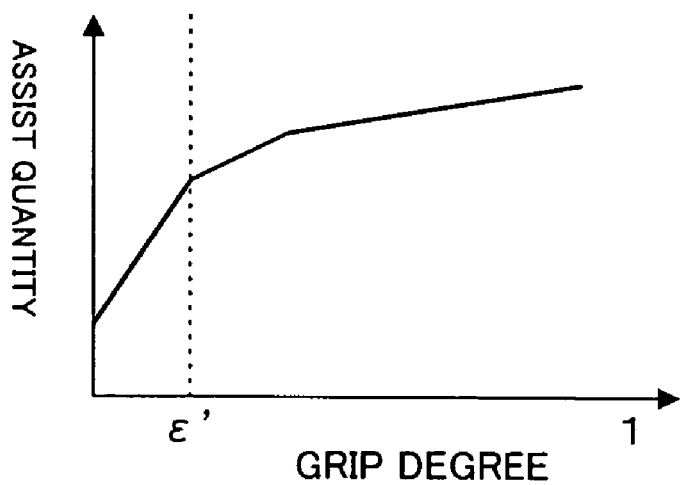

Fig.14
(A)
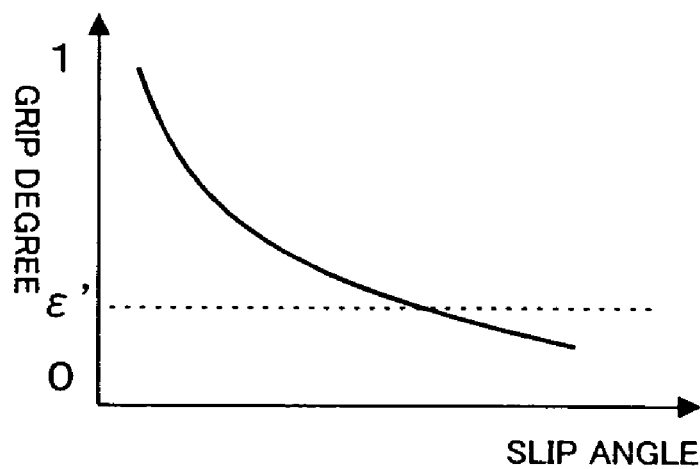
(B)
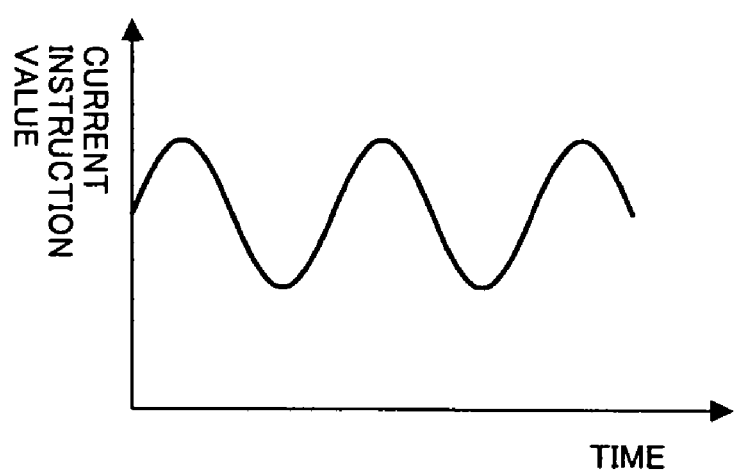

STEERING DEVICE

CROSS-REFERENCE TO RELATED APPLICATION

The present application claims priority under 35 U.S.C. §119 to Japanese Patent Application No. JP 2002-153073. The contents of these applications are incorporated herein by reference.

TECHNICAL FIELD

The present invention relates to a steering apparatus provided with a motor generating an assist force for assisting for a steering force on the basis of a steering torque generated in a steering shaft.

BACKGROUND ART

When a vehicle is suddenly steered during running or the vehicle makes its way into a curve on a road in which a friction coefficient μ of a road surface grounded by a steered wheel (hereinafter, refer to "road surface μ") is small, a side slip and a spin of the vehicle tend to be generated. Accordingly, in the vehicle in recent years, there is introduced a vehicle stability control system for preventing the side slip mentioned above or the like so as to improve a stability of a vehicle behavior.

However, in accordance with the vehicle stability control system mentioned above, the side slip or the like is inhibited from being generated, by controlling a brake force in each of the wheels. Accordingly, if the system is activated, an unexpected brake feeling is applied to a driver although the side slip or the like can be prevented, so that there is a problem that a fear of insecurity is applied to the driver.

The present invention is made for the purpose of solving the problem mentioned above, and an object of the present invention is to provide a steering apparatus which can improve a stability of a vehicle behavior without applying any fear of insecurity to the driver.

DISCLOSURE OF THE INVENTION

In order to achieve the above object, a steering apparatus provided with a motor generating an assist force for assisting for a steering force on the basis of a steering torque generated in a steering shaft according to claim 1, comprising:

a steering force index detecting means for detecting at least one steering force index among steering indexes including a steering torque and a steering force applied to a steering system from a steering wheel of a vehicle to a suspension;

a self-aligning torque estimating means for estimating a self-aligning torque generated in a front wheel of said vehicle on the basis of a detected signal of said steering force index detecting means;

a vehicle state quantity detecting means for detecting a state quantity of said vehicle;

a front wheel index estimating means for estimating at least one front wheel index among front wheel indexes including a side force with respect to the front wheel of said vehicle and a front wheel slip angle on the basis of a detected signal of said vehicle state quantity detecting means;

a grip degree estimating means for estimating a grip degree with respect to at least the front wheel of said vehicle on the basis of a change of the self-aligning torque estimated by said self-aligning torque estimating means, with respect to the front wheel index estimated by said front wheel index estimating means;

a determining means for determining whether or not the grip degree estimated by said grip degree estimating means is less than a predetermined value; and a notifying means for notifying a driver of a fact that the grip degree of the front wheel of said vehicle is close to a limit, in the case that it is determined by said determining means that said estimated grip degree is less than the predetermined value.

In accordance with a first aspect of the present invention, a steering force index detecting means detects at least one steering force index among steering indexes including a steering torque and a steering force applied to a steering system from a steering wheel of a vehicle to a suspension, and a self-aligning torque estimating means estimates a self-aligning torque generated in a front wheel of the vehicle on the basis of a detected signal of the steering force index detecting means. Further, a front wheel index estimating means estimates at least one front wheel index among front wheel indexes including a side force with respect to the front wheel of the vehicle and a front wheel slip angle, by using a state quantity detected by a vehicle state quantity detecting means. Further, a grip degree estimating means estimates a grip degree with respect to at least the front wheel of the vehicle on the basis of a change of the self-aligning torque estimated by the self-aligning torque estimating means, with respect to the front wheel index estimated by the front wheel index estimating means, a determining means determines whether or not the estimated grip degree is less than a predetermined value, and in the case that the estimated grip degree is less than the predetermined value, a notifying means notifies a driver of a fact that the grip degree of the front wheel of the vehicle is close to a limit. Accordingly, the driver can know that the estimated grip degree is less than the predetermined value, that is, it is highly probable that a side slip or the like of the vehicle is generated, on the basis of the notification that the grip degree of the front wheel of the vehicle is close to the limit. Therefore, there can be obtained an effect that a stability of the vehicle behavior can be improved without applying any fear of insecurity to the driver.

According to claim 2, a steering apparatus as claimed in claim 1, wherein said notifying means is constituted by an increase of the assist force generated in said motor.

In accordance with a second aspect of the present invention, the notifying means is constituted by an increase of the assist force generated in the motor. Accordingly, in the case that the estimated grip degree is less than the predetermined value, the assist force assisting the steering force is increased. Therefore, the driver can comprehend the notification that the grip degree of the front wheel of the vehicle is close to the limit by a steering feeling which becomes suddenly light. Accordingly, there can be obtained an effect that a stability of the vehicle behavior can be improved without applying any fear of insecurity to the driver.

According to claim 3, a steering apparatus as claimed in claim 1, wherein said notifying means is constituted by a decrease of the assist force generated in said motor.

In accordance with a third aspect of the present invention, the notifying means is constituted by a decrease of the assist force generated in the motor. Accordingly, in the case that the estimated grip degree is less than the predetermined value, the assist force assisting the steering force is decreased. Therefore, the driver can comprehend the notification that the grip degree of the front wheel of the vehicle is close to the limit by a steering feeling which becomes suddenly heavy. Accordingly, there can be obtained an effect that a stability of the vehicle behavior can be improved without applying any fear of insecurity to the driver.

According to claim 4, a steering apparatus as claimed in claim 1, wherein said notifying means is constituted by a vibration of a drive current applied to said motor.

In accordance with a fourth aspect of the present invention, since the notifying means is constituted by a vibration of a drive current applied to the motor, it is possible to vibrate the steering wheel via the assist force. Therefore, the driver can comprehend the notification that the grip degree of the front wheel of the vehicle is close to the limit by a feeling that the steering wheel vibrates. Accordingly, there can be obtained an effect that a stability of the vehicle behavior can be improved without applying any fear of insecurity to the driver.

BRIEF DESCRIPTION OF THE DRAWINGS

FIG. 13 is a schematic view showing an example of a map determining an assist quantity with respect to a grip degree, in which FIG. 13A shows an example of a map α in which the assist quantity is increased corresponding to the decrease of the grip degree, and FIG. 13B shows an example of a map β in which the assist quantity is increased corresponding to the increase of the grip degree;

FIG. 14A is a schematic view showing an example of a map γ determining the grip degree with respect to the slip angle by the steering apparatus in accordance with the present embodiment;

FIG. 14B is a schematic view showing an example of a wave form obtained by superimposing a sine wave on a current instruction value of the motor;

BEST MODE FOR CARRYING OUT THE INVENTION

A description will be given below of an embodiment of a steering apparatus in accordance with the present invention with referring the drawings. In this case, in the following embodiment, a description will be given by listing up an example in which the steering apparatus in accordance with the present invention is applied to an electrical power steering apparatus (hereinafter, refer to "steering apparatus") of a vehicle such as a motor vehicle or the like.

Figure 1:
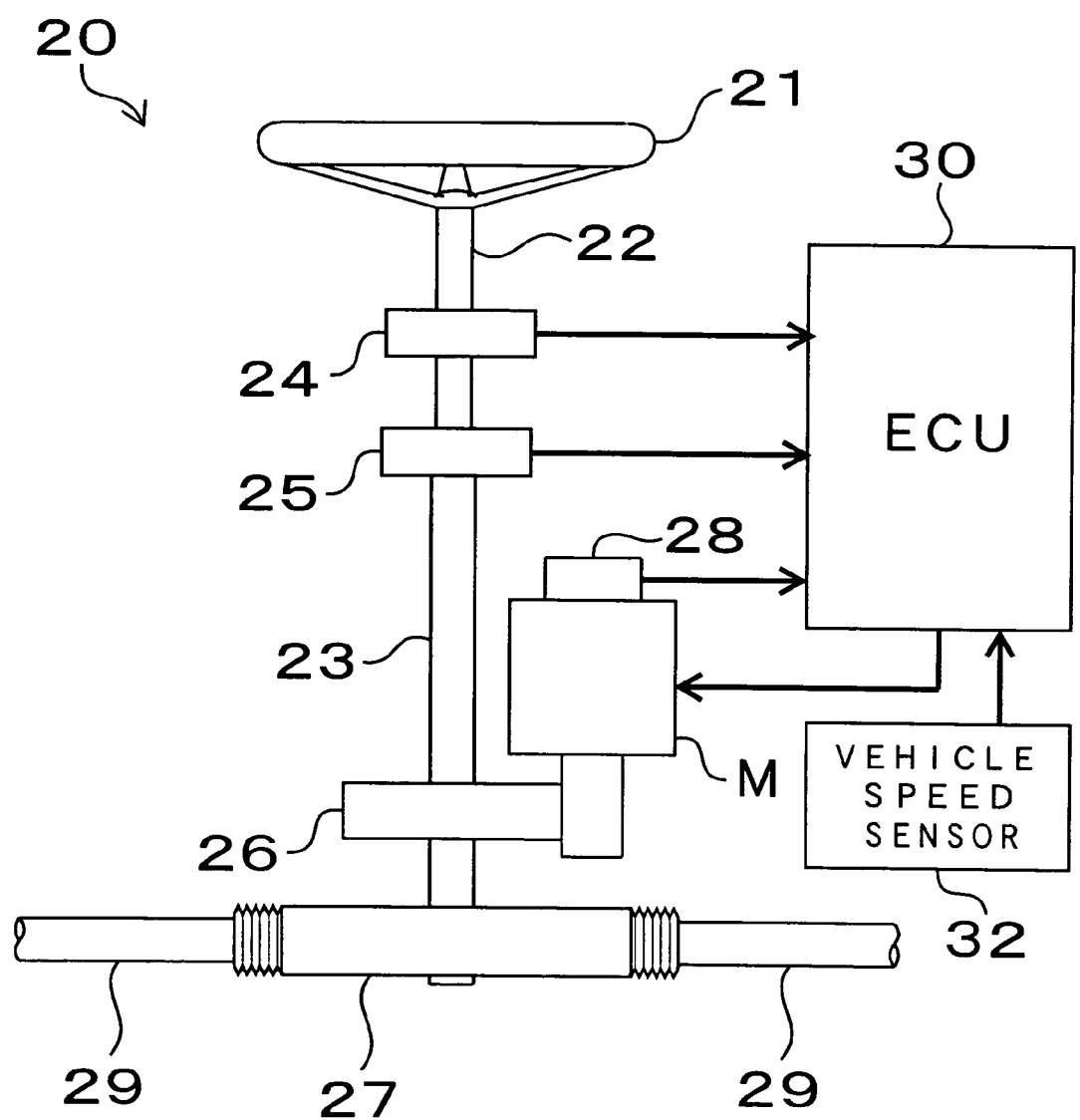
FIG. 1 is a schematic view showing an outline of a structure of a steering apparatus in accordance with an embodiment of the present invention.

A description will be first given of a main structure of a steering apparatus 20 in accordance with the present embodiment with reference to FIG. 1.

As shown in FIG. 1, the steering apparatus 20 is mainly constituted by a steering wheel 21, a steering shaft 22, a pinion shaft 23, a steering angle sensor 24, a torque sensor 25, a reduction gear 26, a rack and pinion 27, a rotation angle sensor 28, a rod 29, an ECU 30, a vehicle speed sensor 32, a motor M and the like, and assists a steering operation of a driver by detecting a steered state by the steering wheel 21 and generating an assist force corresponding to the steered state by the motor M.

In other words, one end side of the steering shaft 22 is connected to the steering wheel 21 operated by the driver, and an input side of the torque sensor 25 is connected to another end side of the steering shaft 22. Further, one end side of the pinion shaft 23 is connected to an output side of the torque sensor 25, and a pinion gear of the rack and pinion 27 is connected to another end side of the pinion shaft 23 via the reduction gear 26. Further, the rod 29 to which a steered wheel (not shown) is attached is connected to both ends of the rack of the rack and pinion 27. In this case, an output of the torque sensor 25 is electrically connected to the ECU 30. Further, in the steering angle sensor 24 which is provided in the middle of the steering shaft 22 and can detect the steering angle, an output thereof is also electrically connected to the ECU 30.

The ECU 30 is constituted by a central processing unit (CPU), a memory (ROM and RAM), an input and output interface and the like which are not illustrated, and is structured such that a steering angle signal from the steering angle sensor 24 and a torque signal from the torque sensor 25 or the like can be respectively input to the CPU via the input and output interface. Further, to the ECU 30, there are connected the vehicle speed sensor 32 which can detect a speed of the vehicle, and the rotation angle sensor 28 which can detect a rotation angle of the motor M controlled by the ECU 30, and the structure is made such that the vehicle speed signal output from the vehicle speed sensor 32 and the rotation angle signal output from the rotation angle sensor 28 can be input to the CPU via the input and output interface.

The motor M is connected to the input and output interface of the ECU 30 via a motor drive circuit (not shown), and is constituted by an electric motor such as a direct-current brushless motor or the like which is controlled so as to be driven by the ECU 30. Further, since the reduction gear 26 is engaged with the output shaft of the motor M via a gear (not shown), a drive force generated in the motor M, that is, an assist force is transmitted to the pinion shaft 23 on the basis of a predetermined transmission ratio by the reduction gear 26, and can steer the steered wheel via the rod 29 or the like. In this case, the structure is made such that a motor current supplied to the motor M from the motor drive circuit (not shown) is detected by the current sensor 34 and input as a motor current signal to the ECU 30.

Figure 2:
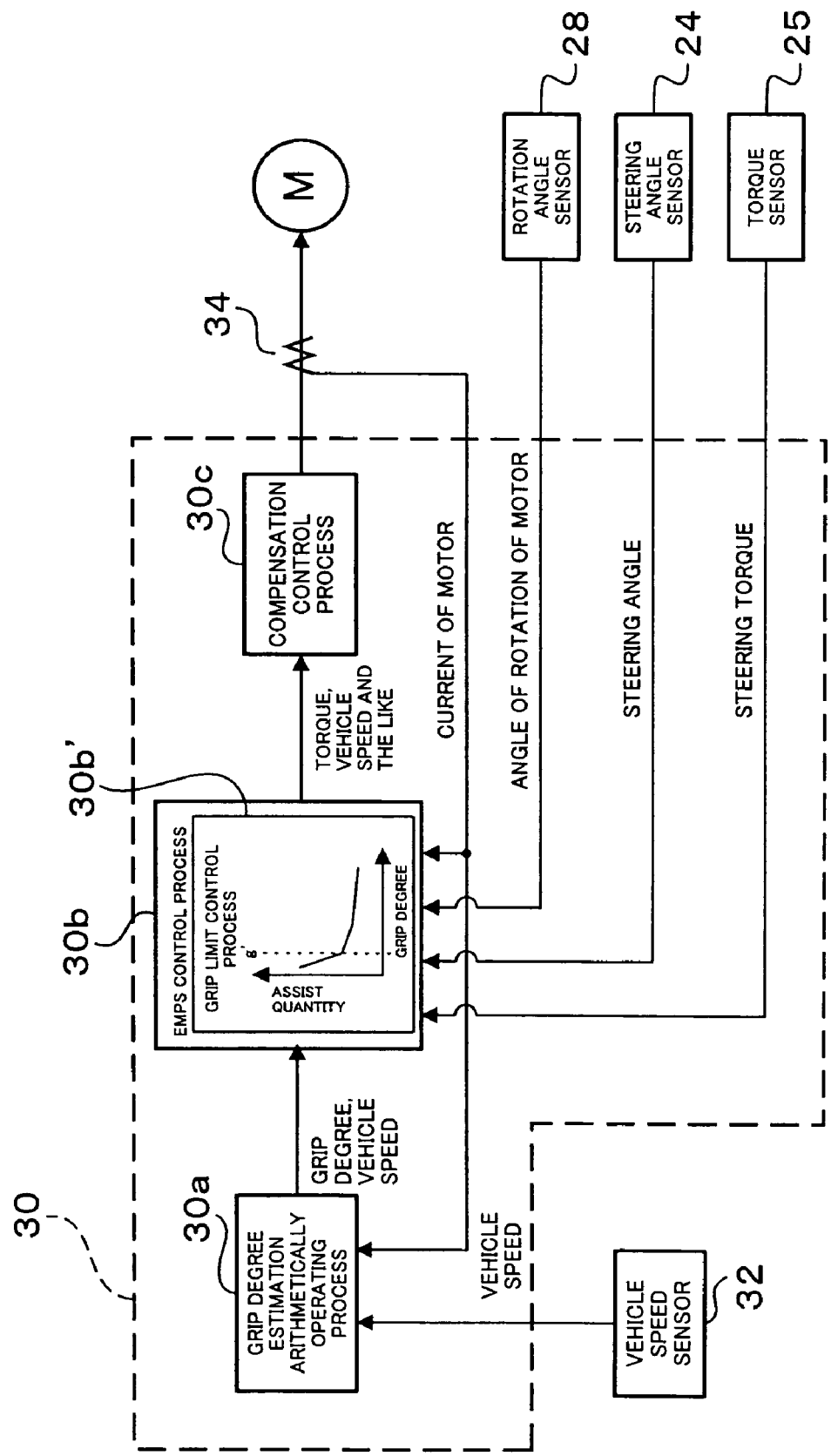
FIG. 2 is a block diagram showing a main electric structure of the steering apparatus in accordance with the present embodiment.

Next, a description will be given of a main electric structure and a motion of the steering apparatus 20. As shown in FIG. 2, the steering apparatus 20 is electrically structured by the ECU 30, the steering angle sensor 24, the torque sensor 25, the rotation angle sensor 28, the vehicle speed sensor 32, the current sensor 34, the motor M and the like. As mentioned above, to the ECU 30, there are input each of the detected signals output from the steering angle sensor 24, the torque sensor 25, the rotation angle sensor 28, the vehicle speed sensor 32 and the current sensor 34, and a current instruction is output from the ECU 30 to the motor drive circuit of the motor M.

In other words, as a basic operation of the electric power steering apparatus, the steering apparatus 20 arithmetically operates the current instruction value which can generate the assist force in the motor M corresponding to the steered state and the vehicle speed in accordance with an EMPS control process 30$b$ executed by the ECU 30, on the basis of the steering angle signal by the steering angle sensor 24, the steering torque signal by the torque sensor 25, the vehicle speed signal by the vehicle speed sensor 32, the rotation angle signal by the rotation angle sensor 28, and the motor current signal by the current sensor 34. Further, the drive control of the motor M is executed by applying a compensation control process 30$c$ such as a phase compensation, a damper compensation or the like by the ECU 30 to the electric instruction value so as to output to the motor drive circuit.

Further, in the steering apparatus 20 in accordance with the present embodiment, in addition to the basic steering force assist motion, a grip limit control process 30$b'$ executing a control for notifying the driver of the grip limit is executed by the ECU 30. In other words, the grip degree of the steered wheel is estimated and arithmetically operated on the basis of the vehicle speed signal and the motor current signal by a grip degree estimating and arithmetically operating process 30$a$ by the ECU 30.

In this case, a description will be given of the estimation of the grip degree mentioned above with reference to FIGS. 3 to 5. In pages 179 to 180 of Automotive Engineering Handbook (First Part) Base and Theory Edition (issued as first edition on Dec. 1, 1990, by Society of Automotive Engineers of Japan), a state in which a tire rolls while side slipping at a side slip angle α is first described as shown in FIG. 3.

Figure 3:
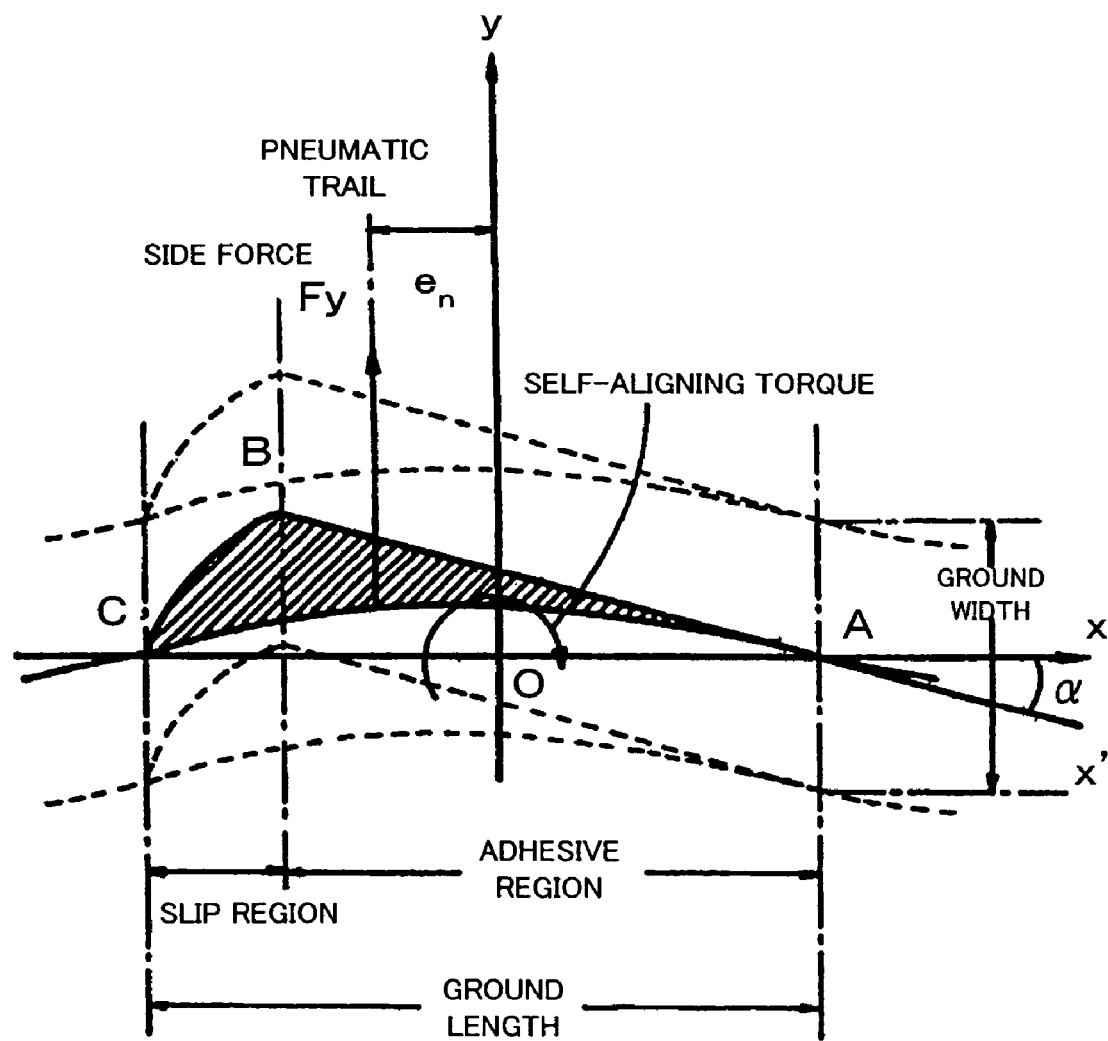
FIG. 3 is a characteristic view showing a relation between a self-aligning torque and a side force in a state in which a tire rolls while side slipping, with respect to a general vehicle.

In other words, in FIG. 3, a tread surface of the tire shown by a broken line is in contact with a road surface at a front end of a ground surface including a point A in FIG. 3, is adhered to the road surface until a point B, and moves in a tire forward moving direction. Then, the tread surface starts slipping at a point where a deformation force generated by a shear deformation in a lateral direction equals to a friction force, and is detached from the road surface at a rear end including a point C so as to return to an original state. At this time, a force Fy (side force) generated in an entire of the ground surface is obtained by a product of a deformation area (a hatched portion in FIG. 3) in the lateral direction of the tread portion and an elastic constant in the lateral direction of the tread portion per unit area. As shown in FIG. 3, a force application point of the side force Fy exists at the rear (in a leftward direction in FIG. 3) of a point (a point O) just below a tire centerline by en (pneumatic trail). Accordingly, a moment Fy·en at this time corresponds to a self-aligning torque (Tsa), and is applied in a direction of reducing the lateral slip angle α.

Next, a description will be given of a case that the tire is attached to the vehicle, with reference to FIG. 4 which is obtained by simplifying FIG. 3. In the steered wheel of the vehicle, in order to improve a return of the steering wheel, a caster angle is provided and a caster trail ec is provided. Accordingly, the ground point of the wheel comes to a point 0', and the moment intending to restore the steering wheel comes to Fy·(en+ec).

Figure 4:
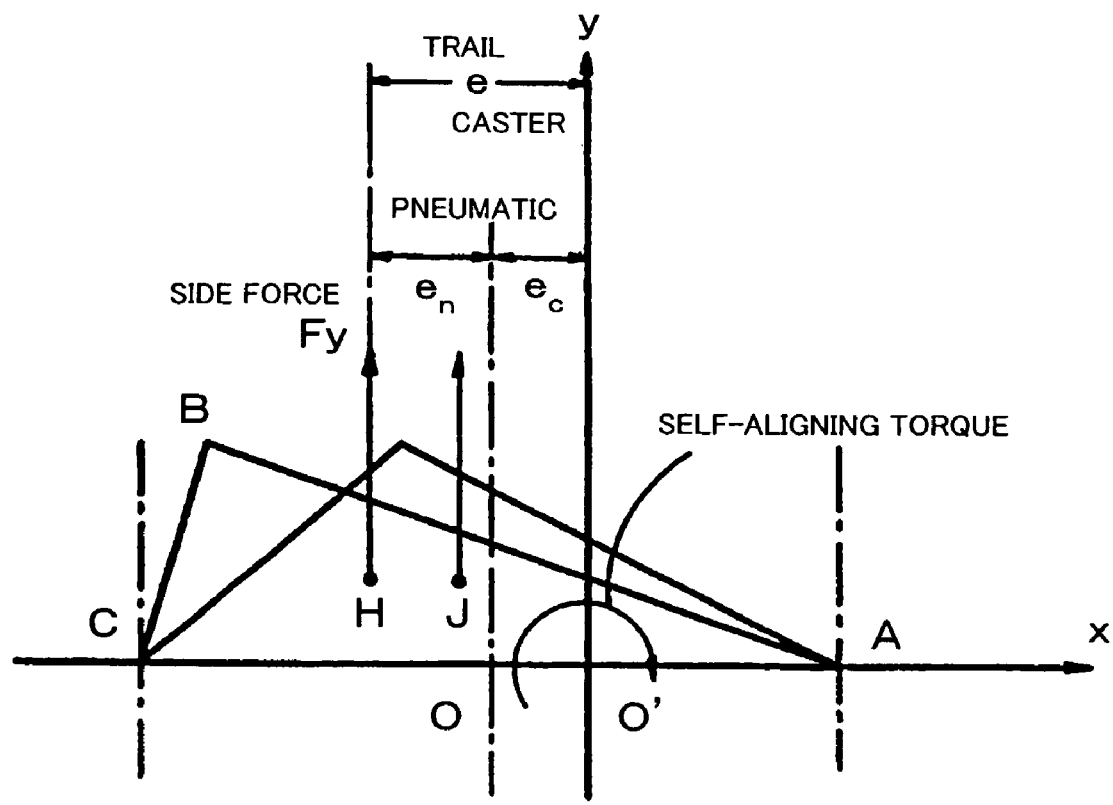
FIG. 4 is a characteristic view briefly showing a relation between the self-aligning torque and the side force in FIG. 3.

If the grip state in the lateral direction of the tire is lowered and the slip region is expanded, the deformation in the lateral direction of the tread portion is changed from a shape of ABC in FIG. 4 to a shape of ADC. As a result, the force application point of the side force Fy is moved forward with respect to the vehicle forward moving direction (from a point H to a point J) in FIG. 4. In other words, the pneumatic trail en becomes smaller. Accordingly, in the case that the adhesion region is large and the slip region is small (that is, in the case that the lateral grip of the tire is high) even if the fixed side force Fy is applied, the pneumatic trail en becomes larger, and the self-aligning torque Tsa becomes larger. On the contrary, if the grip in the lateral direction of the tire is lost and the slip region is increased, the pneumatic trail en becomes smaller, and the self-aligning torque Tsa is decreased.

As mentioned above, it is possible to detect the degree of the grip in the tire lateral direction, by paying attention to the change of the pneumatic trail en. Further, since the change of the pneumatic trail en appears in the self-aligning torque Tsa, it is possible to estimate a grip degree expressing a degree of the grip in the lateral direction with respect to the front wheel of the vehicle (hereinafter, refer to as "grip degree"), on the basis of the self-aligning torque Tsa. Further, the grip degree can be estimated on the basis of the excess degree of the side force with respect to the road surface friction, as mentioned below.

In this case, a lateral force usage rate or a lateral G usage rate is used in JP 11-99956 A, however, the grip degree mentioned above is different from these factors as described below. In the apparatus described in the publication, a maximum lateral force which can be generated on the road surface is determined on the basis of the road surface friction coefficient μ. The road surface friction coefficient μ is estimated on the basis of a road surface friction coefficient μ dependency of a cornering power Cp (which is defined as a value of the side force at a time of the slip angle 1 deg). However, the cornering power Cp is affected not only by the road surface friction coefficient μ but also by a shape of the tire ground surface (a length and a width of the ground surface), an elasticity of a tread rubber, and the like. For example, in the case that the water exists in the tread surface, or in the case that an elasticity of the tread rubber is changed by a worn of the tire and a temperature, a change appears in the cornering power Cp even if the road surface friction coefficient μ is fixed. As mentioned above, in the technique described in the publication, the characteristic of the wheel as the rubber tire is not absolutely considered.

Figure 5:
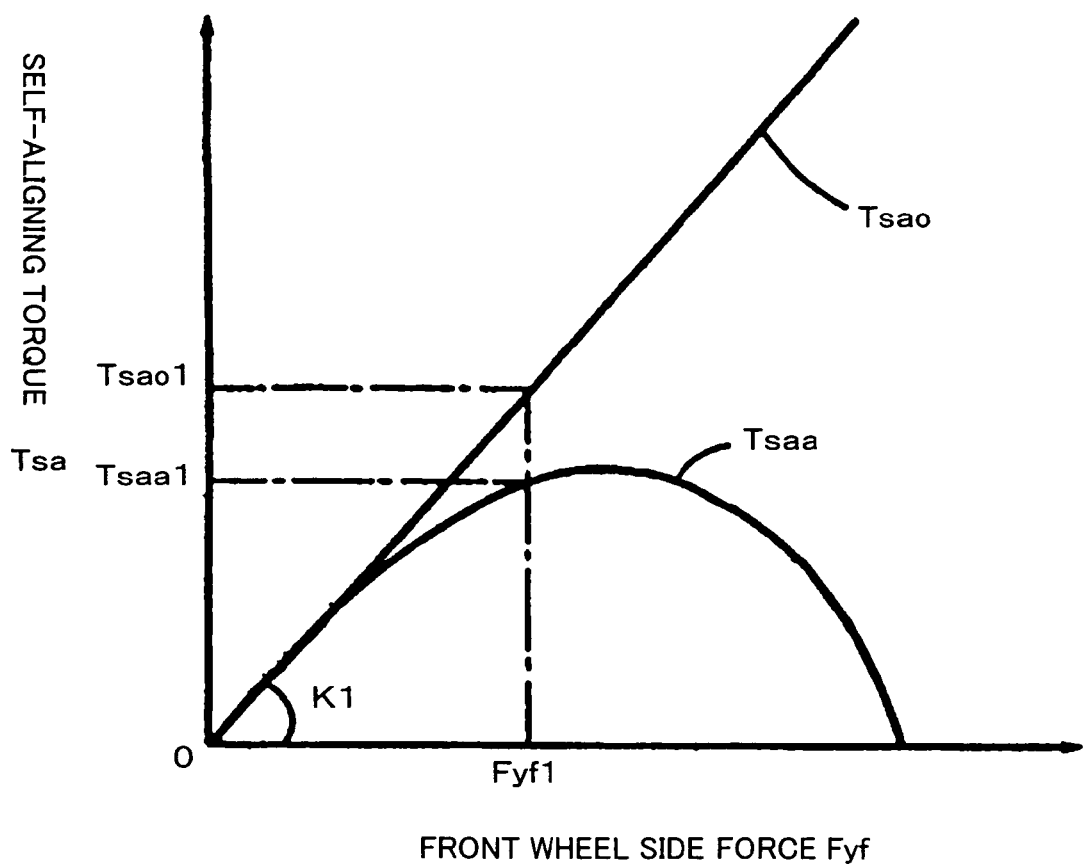
FIG. 5 is a characteristic view showing a characteristic of the self-aligning torque with respect to the front wheel side force in accordance with an embodiment of the present invention.

As is apparent from FIGS. 3 and 4 mentioned above, the characteristic of the self-aligning torque with respect to the front wheel side force applied to the front wheel of the vehicle comes to a characteristic as shown by Tsaa in FIG. 5. As mentioned above, in the case that an actual self-aligning torque is set to Tsaa and the front wheel side force is set to Fyr, a relation Tsaa=Fyf·(en+ec) is established. Accordingly, a nonlinear characteristic of the actual self-aligning torque Tsaa with respect to the front wheel side force Fyf expresses a direct change of the pneumatic trail en. Accordingly, it is possible to identify an inclination K1 with respect to the front wheel side force Fyf near the origin 0 of the actual self-aligning torque Tsaa (in this case, the front wheel is under the grip state), that is, determine a characteristic indicated by a self-aligning torque characteristic in a complete grip state (a reference self-aligning torque Tsao). In this case, it is desirable that the inclination K1 is corrected by using an experimentally determined value as an initial value and identifying it during a normal running having a high grip degree. In this case, the actual self-aligning torque Tsaa is determined in accordance with an arithmetic operation mentioned below.

Further, the grip degree of the front wheel is estimated on the basis of the actual self-aligning torque Tsaa with respect to the reference self-aligning torque Tsao. For example, the grip degree ε can be determined in accordance with the formula ε=Tsaa1/Tsao1, on the basis of a value Tsao1 (=K1·Fyf1) of the reference self-aligning torque Tsao and a value Tsaa1 of the actual self-aligning torque Tsaa, in the case that the front wheel side force is Fyf1.

Figure 6:
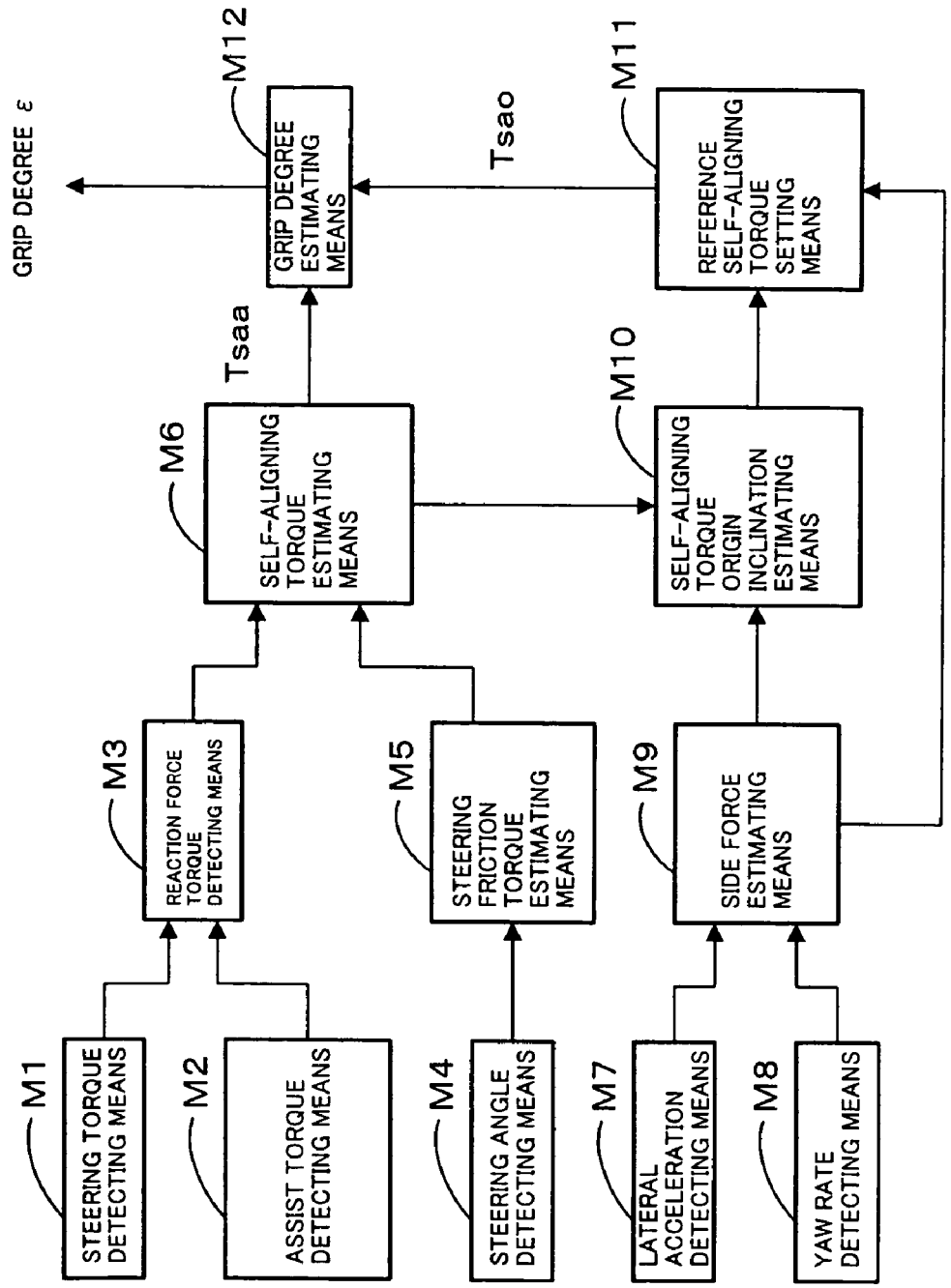
FIG. 6 is a block diagram of a grip degree estimation in accordance with an embodiment of the present invention.

As mentioned above, the grip degree of the wheel can be estimated on the basis of the change of the self-aligning torque (the actual self-aligning torque Tsaa) with respect to the side force (the front wheel side force Fyr), however, this can be achieved by structuring as shown in FIG. 6, and a concrete structure thereof is shown in FIG. 2. First, in FIG. 6, a steering torque detecting means M1 and an assist torque detecting means M2 are provided as a steering force index detecting means for detecting at least one steering force index (for example, the steering torque) among the steering force indexes including the steering torque and the steering force applied to the steering system from the steering wheel (not shown) of the vehicle to the suspension (not shown). A reaction force torque can be detected by a reaction force torque detecting means on the basis of the detected results.

In the present embodiment, for example, the torque sensor 25 shown in FIG. 2 corresponds to the steering torque detecting means M1. Further, the assist torque can be determined on the basis of the motor current of the motor M (corresponding to the assist torque detecting means M2).

Further, the steering angle sensor 24 corresponds to a steering angle detecting means M4 in FIG. 6, and a steering friction torque can be estimated by a steering friction torque estimating means M5 on the basis thereof. In this case, this matter will be mentioned later.

Accordingly, the actual self-aligning torque Tsaa generated in the front wheels FL and FR of the vehicle can be estimated by a self-aligning torque estimating means M6 on the basis of the detected results of the reaction force torque detecting means M3 and the steering friction torque estimating means M5.

On the other hand, in accordance with the present embodiment, a lateral acceleration detecting means M7 and a yaw rate detecting means M8 are provided as a vehicle state quantity detecting means for detecting the state quantity of the vehicle, and at least one front wheel index (the front wheel side force Fyf in FIG. 6) among the front wheel indexes including the side force and the front wheel slip angle with respect to the front wheels FL and FR of the vehicle can be estimated by a side force estimating means M9 corresponding to the front wheel index estimating means, on the basis of these detected signals.

The front wheel side force Fyr is estimated in accordance with an formula Fyf=(Lr·m·Gy+Iz·dγ/dt)/L on the basis of the output results of the lateral acceleration detecting means M7 and the yaw rate detecting means M8. In this case, reference symbol Lr denotes a distance from a center of gravity to a rear wheel axis, reference symbol m denotes a mass of the vehicle, reference symbol L denotes a wheel base, reference symbol Iz denotes a yaw moment of inertia, reference symbol Gy denotes a lateral acceleration, and reference symbol dγ/dt denotes a time differential value of the yaw rate.

Further, a reference self-aligning torque is set by a reference self-aligning torque setting means M11 on the basis of the actual self-aligning torque Tsaa estimated by the self-aligning torque estimating means M6, and the front wheel side force Fyf estimated by the side force estimating means M9. For example, an inclination near the origin of the self-aligning torque is estimated by a self-aligning torque origin inclination estimating means M10, and the reference self-aligning torque is set by the reference self-aligning torque setting means M11. Further, the grip degree ε with respect to the front wheel is estimated by a grip degree estimating means M12 based on the compared result of the reference self-aligning torque set by the reference self-aligning torque setting means M11, and the self-aligning torque estimated by the self-aligning torque estimating means M6.

In other words, the self-aligning torque inclination K1 near the origin in FIG. 5 is determined on the basis of the actual self-aligning torque Tsaa estimated by the self-aligning torque estimating means M6, and the front wheel side force Fyf estimated by the side force estimating means M9. The reference self-aligning torque Tsao can be determined as Tsao=K1·Fyf on the basis of the inclination K1 and the front wheel side force Fyf, and is compared with the actual self-aligning torque Tsaa. The grip degree ε can be determined as ε=Tsaa/Tsao on the basis of the compared result.

As mentioned above, in accordance with the present embodiment, since the drive current of the motor M has a proportionality relation to the assist torque, it is possible to easily estimate the reaction force torque on the basis of the assist torque and the detected result of the steering torque detecting means M1. Further, it is necessary to compensate the torque caused by the friction of the steering system, however, since a difference between a maximum value of the reaction force torque at a time of further turning the steering wheel and the reaction force torque at a time of turning back the steering wheel is arithmetically operated in the steering friction torque estimating means M5, and the friction torque is sequentially corrected, it is possible to properly estimate the self-aligning torque (the actual self-aligning torque Tsaa). As a matter of fact, the present invention is not limited to this, for example, the structure may be made such that a load cell or the like is attached to the steering shaft (not shown) or a strain gauge is provided in the suspension member, whereby the self-aligning torque can be measured on the basis of the detected signal.

Figure 7:
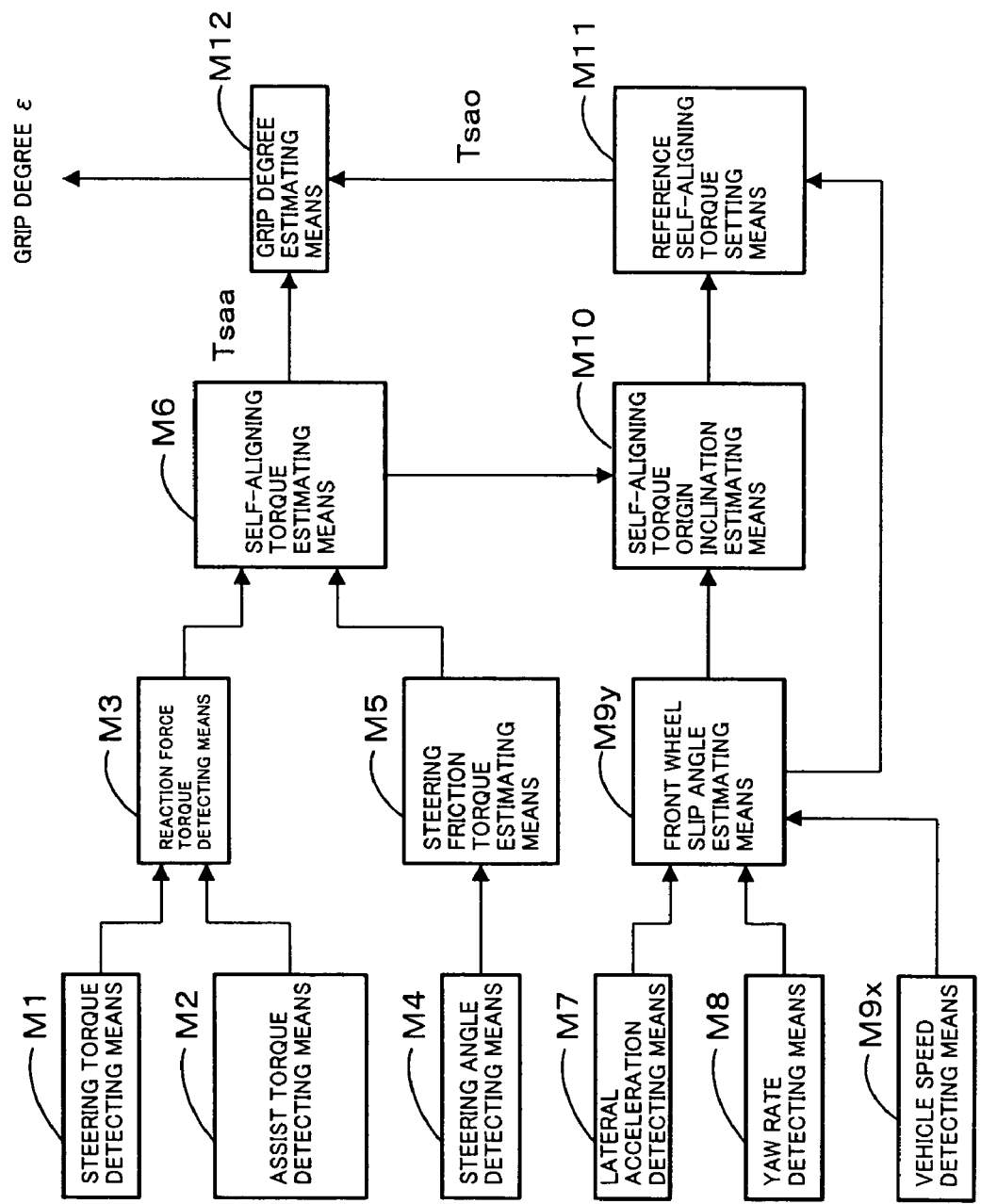
FIG. 7 is a block diagram of a grip degree estimation in accordance with the other embodiment of the present invention.

Next, FIGS. 7 to 12 relate to the other aspect of the grip degree estimation in accordance with the present invention, in which a front wheel slip angle is used as the front wheel index of the present invention. FIG. 7 is a block diagram of a means for estimating the grip degree from the front wheel slip angle and the self-aligning torque. The blocks M1 to M6 are the same as those in FIG. 6, and the reaction force torque and the steering system friction torque are arithmetically operated, and the self-aligning torque is estimated. On the other hand, since the front wheel slip angle is determined on the basis of the steering angle, the yaw rate, the lateral acceleration and the vehicle speed, the detected signals of the steering angle detecting means M4, the lateral acceleration detecting means M7 and the yaw rate detecting means M8 are input to a slip angle estimating means M9y together with a detected signal of a vehicle speed detecting means M9x, in the same manner as that of FIG. 6.

In the front wheel slip angle estimating means M9y, first, a vehicle body slip angular velocity dβ/dt is determined on the basis of the yaw rate, the lateral acceleration and the vehicle speed, and a vehicle body slip angle β is determined by integrating the vehicle body slip angular velocity dβ/dt. A wheel slip angle, in particular, a wheel slip angle of the front wheel (hereinafter, refer to as a front wheel slip angle) αf is arithmetically operated from the vehicle speed, the steering angle and the vehicle data, on the basis of the vehicle body slip angle β. In this case, the vehicle body slip angle β may be arithmetically operated by an estimation on the basis of the vehicle model or a combination of an integral method therewith, in addition to the method by the integration.

The inclination of the origin of the self-aligning torque is identified by the self-aligning torque origin inclination estimating means M10 on the basis of the self-aligning torque and the front wheel slip angle αf estimated as mentioned above, and the reference self-aligning torque is set by the reference self-aligning torque setting means M11 on the basis of the inclination and the front wheel slip angle. Further, the grip degree ε with respect to the front wheel is estimated by the grip degree estimating means M12 on the basis of the reference self-aligning torque set by the reference self-aligning torque setting means M11 and the self-aligning torque estimated by the self-aligning torque estimating means M6.

Figure 8:
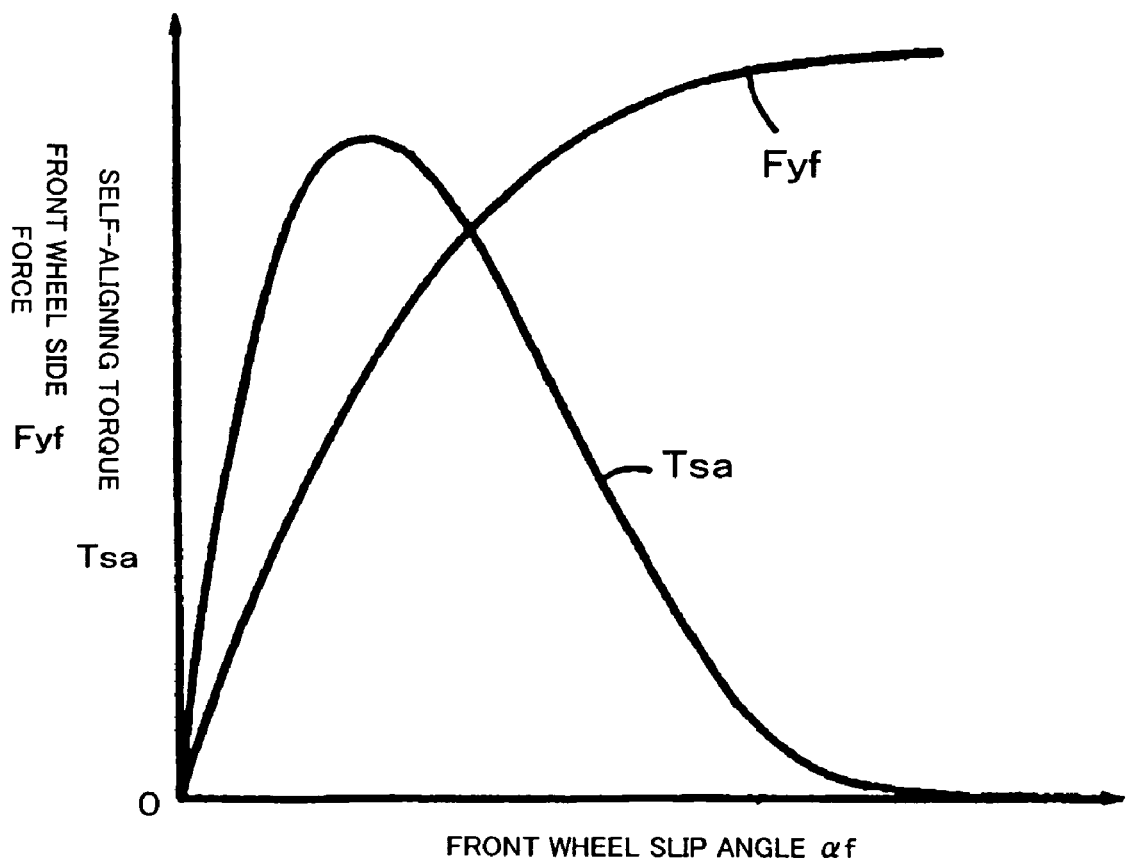
FIG. 8 is a characteristic view showing a relation of the front wheel side force and the self-aligning torque with respect to a front wheel slip angle in accordance with the other embodiment of the present invention.
Figure 9:
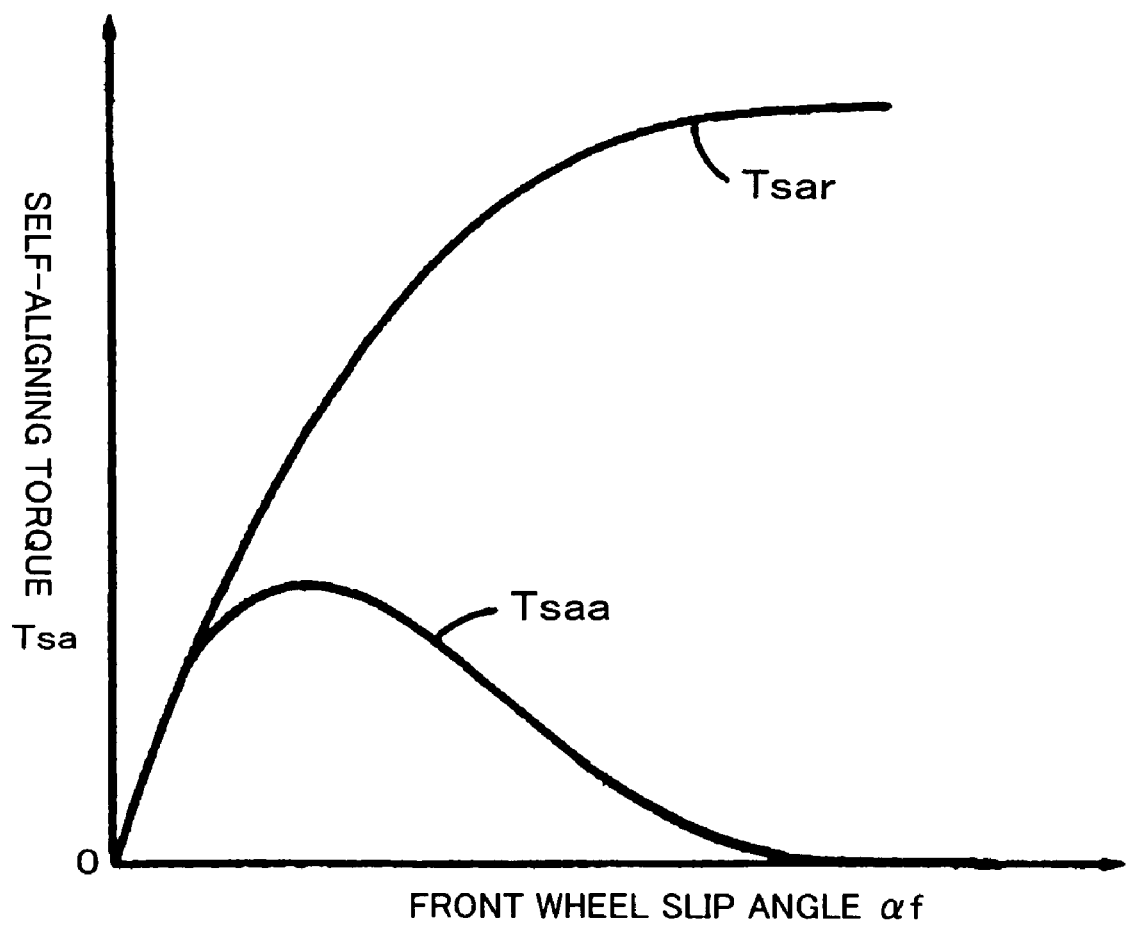
FIG. 9 is a characteristic view showing a relation of the self-aligning torque with respect to the front wheel slip angle in accordance with the other embodiment of the present invention.

A description will be given of the estimation of the grip degree ε in the embodiment described in FIG. 7 mentioned above, referring to FIGS. 8 to 12. First, a relation between the front wheel side force Fyf and the self-aligning torque Tsa with respect to the front wheel slip angle αf comes to a non-linear characteristic with respect to the front wheel slip angle αf as shown in FIG. 8. Since the self-aligning torque Tsa is obtained by a product of the front wheel side force Fyf and the trail e (=en+ec), the self-aligning torque characteristic in the case that the wheel (the front wheel) is in the grip state, that is, in the case that the pneumatic trail en is in the complete grip state, comes to a non-linear characteristic as shown by Tsar in FIG. 9.

Figure 10:
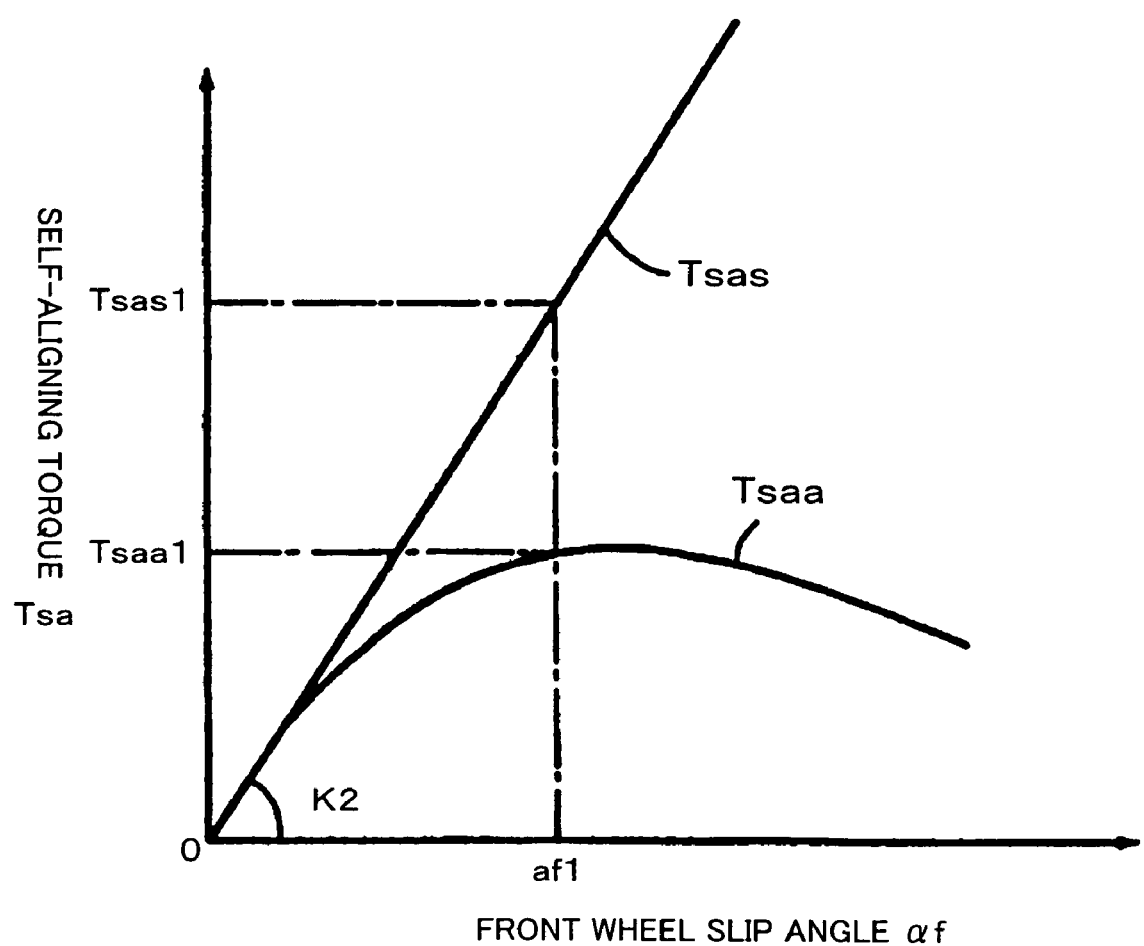
FIG. 10 is a characteristic view showing a relation of the self-aligning torque with respect to the front wheel slip angle in accordance with the other embodiment of the present invention.

However, in the present embodiment, the self-aligning torque characteristic in the complete grip state is assumed as a linear, an inclination K2 of the self-aligning torque Tsa with respect to the front wheel slip angle near the origin is determined as shown in FIG. 10, and the reference self-aligning torque characteristic (shown by Tsas in FIG. 10) is set. For example, in the case that the front wheel slip angle is αf1, the reference self-aligning torque is arithmetically operated by the formula Tsas1=K2·αf1. Further, the grip degree ε is determined as the formula ε=Tsaa1/Tsas1=Tsaa1/(K2·αf1).

Figure 11:
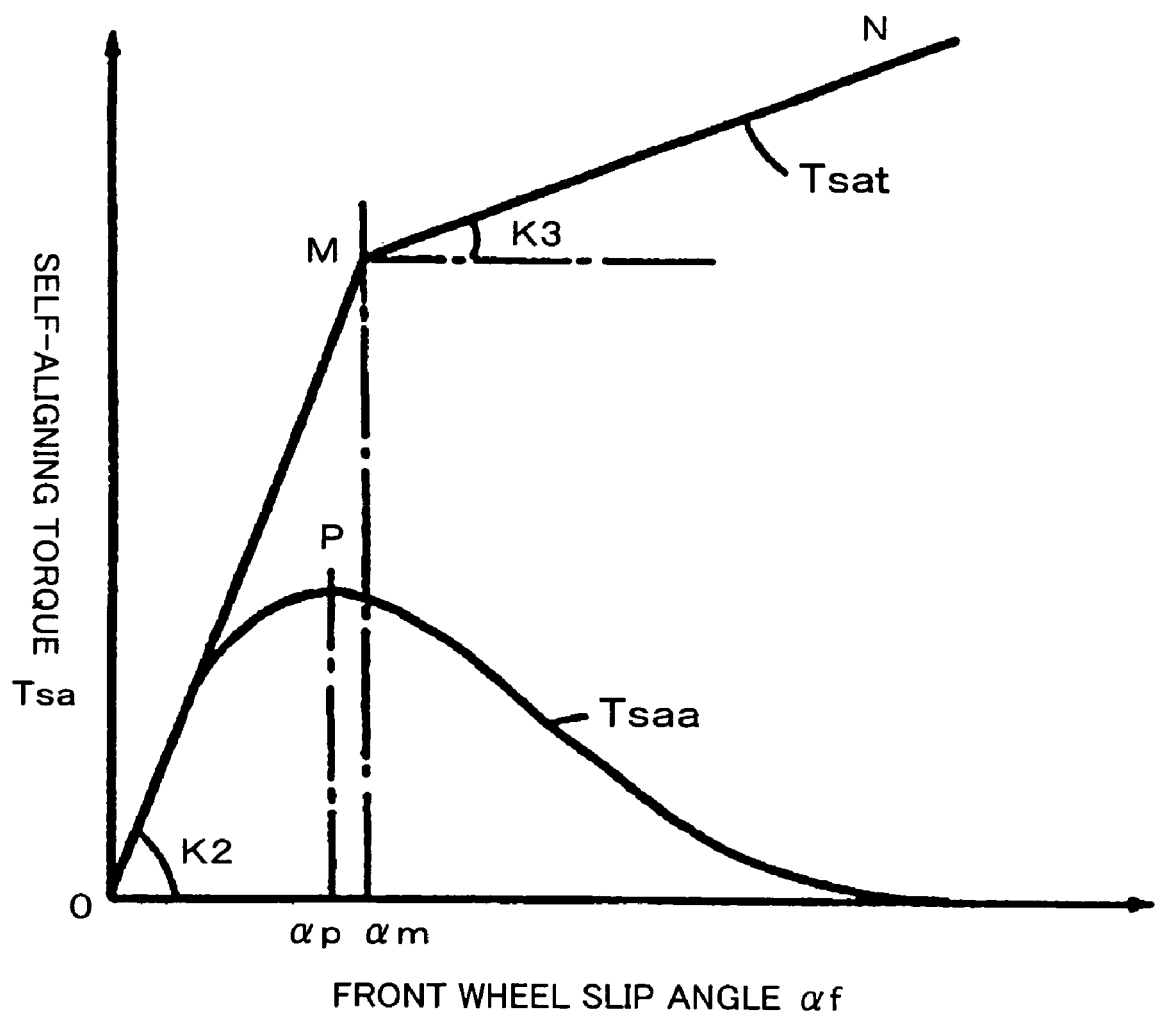
FIG. 11 is a characteristic view showing a relation of the self-aligning torque with respect to the front wheel slip angle in accordance with the other embodiment of the present invention.

In the setting method of the reference self-aligning torque in FIG. 10, since the reference self-aligning torque characteristic is assumed to be linear, an error at a time of estimating the grip degree becomes large in a region in which the front wheel slip angle αf is large, and there is fear that an estimating accuracy of the grip degree is lowered. Accordingly, as shown in FIG. 11, in the case of being equal to or more than a predetermined front wheel slip angle, it is desirable to set the inclination of the self-aligning torque to K3 and to set the non-linearity of the reference self-aligning torque characteristic to be similar to a straight line as shown by 0-M-N in FIG. 11. In this case, it is desirable to previously determine the inclination K3 of the self-aligning torque experimentally, and to identify and correct the inclination K3 during running. Further, it is preferable that the point M is set on the basis of an inflection point (a point P) of the actual self-aligning torque. For example, the inflection point P of the actual self-aligning torque is determined, and a front wheel slip angle αm which is larger at a predetermined value than the front wheel slip angle αP of the inflection point P is set as the point M.

Figure 12:
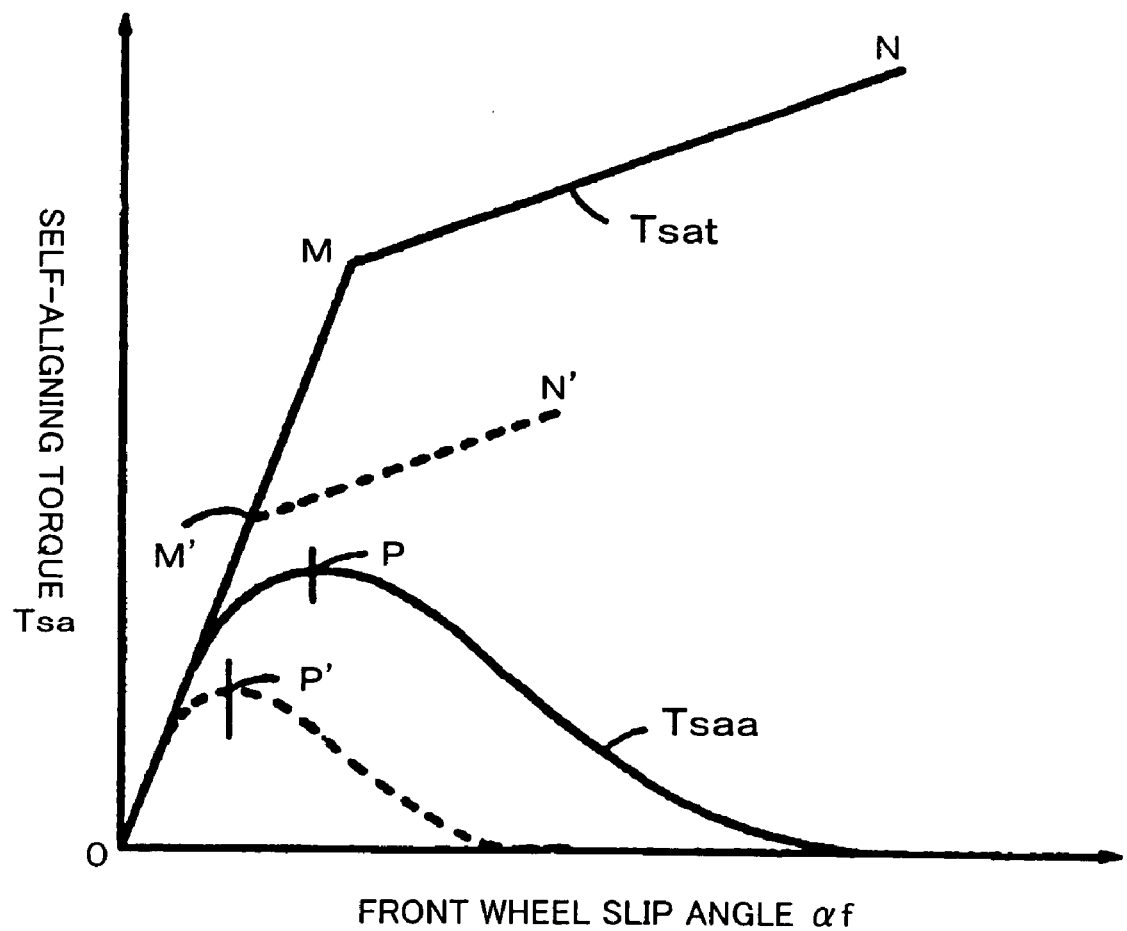
FIG. 12 is a characteristic view showing a relation of the self-aligning torque with respect to the front wheel slip angle in accordance with the other embodiment of the present invention.

Further, since the reference self-aligning torque with respect to the front wheel slip angle is affected by the road surface friction coefficient μ, it is possible to set an accurate reference self-aligning torque characteristic by setting the reference self-aligning torque on the basis of the inflection point P of the actual self-aligning torque Tsaa as shown in FIG. 12. For example, in the case that the road surface friction coefficient becomes low, the characteristic of the actual self-aligning torque Tsaa is changed as shown by a broken line from a solid line in FIG. 12. In other words, if the road surface friction coefficient μ is lowered, the inflection point of the actual self-aligning torque Tsaa is changed from the point P to a point P'.

Accordingly, it is necessary to change the reference self-aligning torque characteristic (Tsat) from 0-M-N to 0-M'-N'. In this case, since the point M' is set on the basis of the inflection point P' as mentioned above, it is possible to set the reference self-aligning torque characteristic following to the change even if the road surface friction coefficient is changed.

In the embodiment mentioned above, the grip degree ε is determined on the basis of the self-aligning torque by paying attention to the change of the pneumatic trail in the tire, however, it is possible to estimate a grip degree expressing a degree of the grip in the lateral direction with respect to the wheel (the grip degree in this case is set to εm) on the basis of the excess degree of the side force with respect to the road surface friction as mentioned below.

First, in accordance with a theoretic model (a brush model) of a tire generative force, a relation between the front wheel side force Fyf and the self-aligning torque Tsaa is expressed by the following formulas (1) to (4). In other words, in the case of ξ=1−{Ks/(3·μ·Fz)}·λ, a case ξ>0 can be expressed by the following formula (1), a case ξ≦0 can be expressed by the following formula (2), a case ξ>0 can be expressed by the following formula (3) and a case ξ≦0 can be expressed by the following formula (4), respectively.

$$Fyr = \mu \cdot Fz \cdot (1 - \xi^3) \quad (1)$$

$$Fyf = \mu \cdot Fz \quad (2)$$

$$Tsaa = (1 \cdot Ks/6) \cdot \lambda \cdot \xi 3 \quad (3)$$

$$Tsaa = 0 \quad (4)$$

In this case, reference symbol Fz denotes a ground load, reference symbol 1 denotes a ground length of the tire ground surface, reference symbol Ks denotes a constant corresponding to a tread rigidity, reference symbol λ denotes a lateral slip ($\lambda = \tan(\alpha f)$), and reference symbol αf denotes a front wheel slip angle.

In general, since the front wheel slip angle αf is small in the region $\xi > 0$, it is possible to treat on the assumption of $\lambda = \alpha f$. As is apparent from the formula (1) mentioned above, since the maximum value of the side force is μ·Fz, a rate of the side force in correspondence to the road surface friction coefficient μ with respect to the maximum value can be expressed by a road surface friction utilization ratio $\eta = 1 - \xi 3$. Accordingly, the formula $\epsilon m = 1 - \eta$ means the road surface friction excess degree, and on the assumption that ∈m is the grip degree of the wheel, $\epsilon m = \xi 3$ is established. Therefore, the formula (3) mentioned above can be expressed by the following formula (5).

$$Tsaa = (1 \cdot Ks/6) \cdot \alpha f \cdot \epsilon m \quad (5)$$

The formula (5) mentioned above shows that the self-aligning torque Tsaa is in proportion to the front wheel slip angle αf and the grip degree ∈m. Accordingly, if a characteristic in the grip degree ∈m=1 (the friction utilization rate of the road surface is zero, that is, the friction excess degree is 1) is set to the reference self-aligning torque characteristic, the following formula (6) is established.

$$Tsau = (1 \cdot Ks/6) \cdot \alpha f \quad (6)$$

Accordingly, the grip degree ∈m can be determined as the following formula (7), on the basis of the formulas (5) and (6) mentioned above.

$$\epsilon m = Tsaa/Tsau \quad (7)$$

As is apparent from a fact that the road surface friction coefficient μ is not included as a parameter in the formula (7), the grip degree ∈m can be calculated without using the road surface friction coefficient μ. In this case, an inclination $K4 (=1 \cdot Ks/6)$ of the reference self-aligning torque Tsau can be previously set by using the brush model mentioned above. Further, it is possible to experimentally determine. Further, a detection accuracy can be improved by first setting an initial value, and identifying and correcting the inclination of the self-aligning torque at a position where the front wheel slip angle is close to zero during running.

Figure 16:
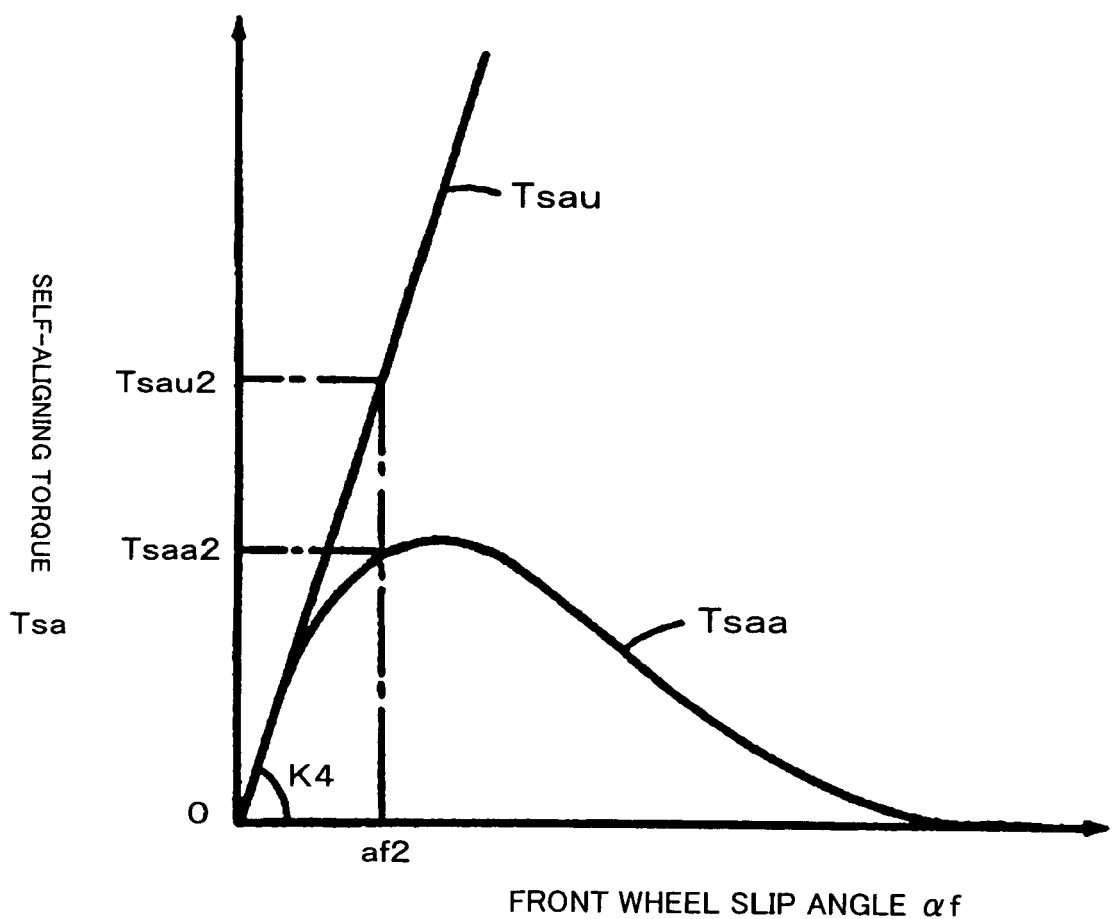
FIG. 16 is a characteristic view showing a relation of the self-aligning torque with respect to the front wheel slip angle in accordance with further the other embodiment of the present invention.

For example, in the case that the front wheel slip angle is αr2 in FIG. 16, the reference self-aligning torque is arithmetically operated by the formula $Tsau2 = K4 \cdot \alpha f2$. Further, the grip degree ∈m is determined as the formula $\epsilon m = Tsaa2/Tsau2 = Tsaa2/(K4 \cdot \alpha f2)$.

Figure 17:
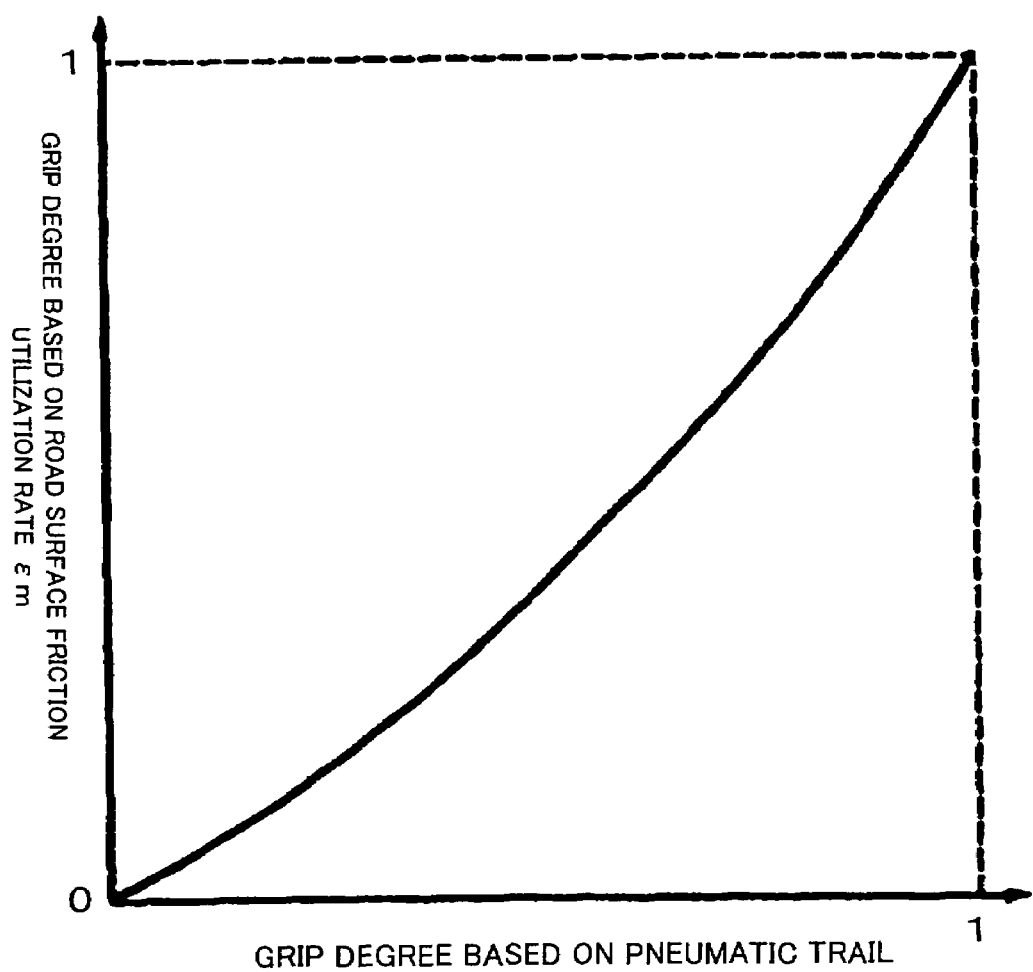
FIG. 17 is a characteristic view showing a relation between a grip degree $\epsilon$ on the basis of a pneumatic trail and a grip degree $\epsilon m$ on the basis of a road surface friction excess degree in the present invention.

Accordingly, the grip degree ∈m on the basis of the road surface friction excess degree mentioned above can be used in place of the grip degree ∈ on the basis of the pneumatic trail described in FIGS. 3 to 11 mentioned above. Further, the grip degree ∈ and the grip degree ∈m mentioned above have a relation shown in FIG. 17. Accordingly, it is possible to convert into the grip degree ∈m by determining the grip degree ∈, and it is conversely possible to convert into the grip degree ∈ by determining the grip degree ∈m.

In this case, if the grip degree is estimated by comparing the actual self-aligning torque with the reference self-aligning torque as mentioned above, it is possible to estimate the grip degree ∈ of the wheel on the basis of the pneumatic trail change without determining the maximum force which the wheel can generate, that is, the road surface friction coefficient μ as in the related art (for example, JP11-99956A). Accordingly, a robustness of the estimation is higher in comparison with the conventional method of determining the road surface friction coefficient, and an accuracy thereof is improved.

The estimation of the grip degree ∈ as mentioned above is executed by a grip degree estimation arithmetically operating process 30a, and the map arithmetical operation is executed in accordance with a grip limit control process 30b' on the basis of the estimated grip degree. The map arithmetic operation is executed on the basis of a map which can definitely determine a relation of the assist quantity with respect to the grip degree as shown in FIGS. 13A and 13B.

For example, in the case of referring to the map α shown in FIG. 13A, the assist quantity is set such that the lower the grip degree ∈ estimated by the grip degree estimation arithmetically operating process 30a is, the more the assist force is increased, and in the case that it is less than a predetermined grip degree ∈', the relation of the assist quantity with respect to the grip degree ∈ is mapped so as to rapidly increase the assist quantity. Since the "predetermined grip degree ∈'" is previously set near the lower limit value of the grip degree of the steered wheel, the degree less than the predetermined grip degree ∈' indicates a probability that the side slip, the spin or the like of the vehicle is generated. Accordingly, in accordance with the grip limit control process 30b', it is determined whether or not the grip degree ∈ estimated by the grip degree estimation arithmetically operating process 30a is less than the predetermined grip degree ∈', and in the case that it is determined that the estimated grip degree ∈ is less than the predetermined grip degree ∈', the process applies such a feeling that the steering operation by the steering wheel 21 suddenly becomes light to the driver, by suddenly increasing the assist quantity by the motor M, thereby notifying the driver of the matter that the grip degree of the steered wheel is close to the limit. Therefore, it is possible to transmit to the driver the probability that the side slip is generated by further turning the steering wheel 21 in the same direction as the current direction, thereby calling the driver's attention for steering. Accordingly, there is an effect that the stability of the vehicle behavior can be improved without applying any fear of insecurity to the driver.

On the other hand, in the case of referring to the map β shown in FIG. 13B, the assist quantity is set such that the lower the grip degree ∈ estimated by the grip degree estimation arithmetically operating process 30a is, the less the assist force is decreased, and in the case that it is less than a predetermined grip degree ∈', the relation of the assist quantity with respect to the grip degree ∈ is mapped so as to rapidly decrease the assist quantity. Accordingly, in accordance with the grip limit control process 30b', it is determined whether or not the grip degree ∈ estimated by the grip degree estimation arithmetically operating process 30a is less than the predetermined grip degree ∈', and in the case that it is determined that the estimated grip degree ∈ is less than the predetermined grip degree ∈', the process applies such a feeling that the steering operation by the steering wheel 21 suddenly becomes heavy to the driver, by suddenly decreasing the assist quantity by the motor M, thereby notifying the driver of the matter that the grip degree of the steered wheel is close to the limit. Therefore, it is possible to transmit to the driver the probability that the side slip is generated by further turning the steering wheel 21 in the same direction as the current direction in the same manner as the case of the map α shown in FIG. 13A, thereby calling the driver's attention for steering. Accordingly, there is an effect that the stability of the vehicle behavior can be improved without applying any fear of insecurity to the driver.

Further, as shown in FIG. 14A, it is possible to arithmetically operate by map the grip degree ϵ on the basis of the slip angle of the steered wheel, by using the map γ obtained by mapping the relation of the grip degree with respect to the slip angle. In this case, in accordance with the grip degree estimation arithmetically operating process 30*a* or the grip limit control process 30*b*', it is determined whether or not the grip degree ϵ estimated by the map γ is less than a predetermined grip degree ϵ', and in the case that it is determined that the estimated grip degree ϵ is less than the predetermined grip degree ϵ', a sine wave signal is superimposed on the current instruction value of the motor M, as shown in FIG. 14B. In this case, the sine wave signal is a vibration frequency having such a degree as the driver can feel as a vibration applied to the hands thereof via the steering wheel 21, for example, equal to or more than 5 Hz and equal to or less than 20 Hz.

Accordingly, since it is possible to apply the feeling that the steering wheel 21 is vibrated to the driver, by vibrating the drive current of the motor M, it is possible to notify the driver of the matter that the grip degree of the steered wheel is close to the limit. Therefore, it is possible to transmit to the driver the probability that the side slip or the like is generated by turning the steering wheel 21 further in the same direction as the current direction, and it is possible to call driver's attention for steering, whereby there can be obtained an effect that the stability of the vehicle behavior can be improved without applying any fear of insecurity to the driver.

Figure 15:
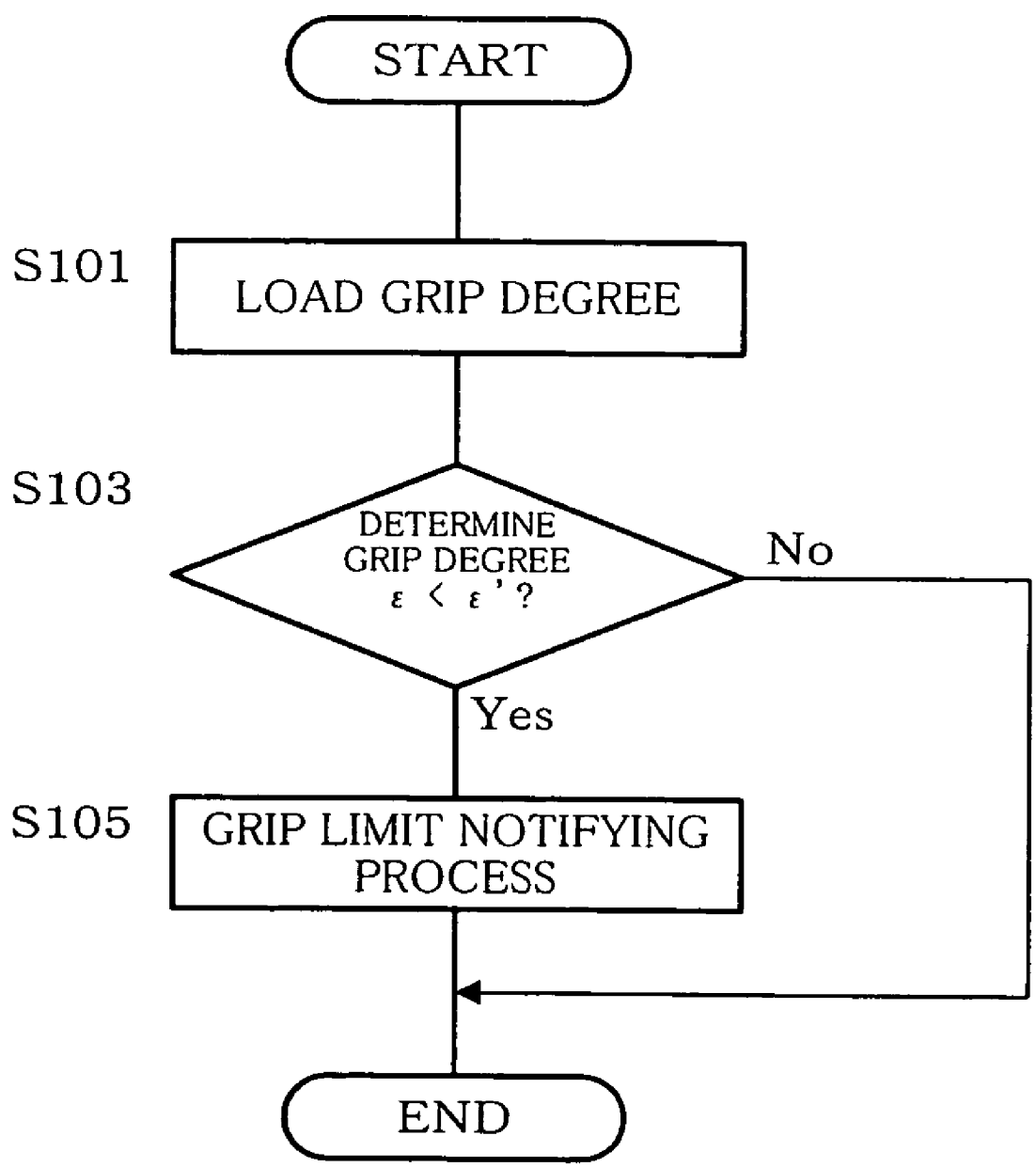
FIG. 15 is a flow chart showing a flow of a grip limit control process by the steering apparatus in accordance with the present embodiment.

In this case, the process by the grip limit control process 30*b*' mentioned above can be executed in accordance with a grip limit control process as shown in FIG. 15. In this case, the grip limit control process is similar to an interrupt process which is repeatedly executed per a fixed time by the ECU 30, and a description of a series of main routine will be omitted. Further, the grip limit control process is stored in the memory (ROM and RAM) of the ECU 30.

As shown in FIG. 15, in the grip limit control process, a process for loading the grip degree of the steered wheel is executed by a step S101, after a predetermined initializing process. This process is a process for acquiring the grip degree estimated by the grip degree estimation arithmetically operating process 30*a* mentioned above, and the grip degree acquired by the process is used in a grip degree determining process by the next step S103.

In the step S103, there is executed a determining process for determining whether or not the grip degree ϵ acquired by the step S101 is less than the predetermined grip degree ϵ'. Further, in the case that it is possible to determine that the acquired grip degree ϵ is less than the predetermined grip degree ϵ' (Yes in S103), it is necessary to notify the driver of the matter that the grip degree of the steered wheel is close to the limit. Accordingly, the process is changed to a step S105. On the other hand, in the case that it is impossible to determine that the acquired grip degree ϵ is less than the predetermined grip degree ϵ' (No in S103), there is nothing to be notified to the driver. Accordingly, the present series of grip limit control process is finished by skipping the step S105.

In the step S105, there is executed a grip limit notifying process, that is, "process for suddenly increasing the assist force by the motor M", "process for suddenly decreasing the assist by the motor M" or "process for superimposing the sine wave on the drive current of the motor M" as mentioned above, and thereafter, the present series of grip limit control process is finished. Accordingly, since it is possible to notify the driver of the matter that the grip degree of the steered wheel is close to the limit, it is possible to transmit to the driver the probability that the side slip or the like is generated by turning the steering wheel 21 further in the same direction as the current direction, and it is possible to call driver's attention for steering.

In accordance with the grip limit control process by the steering apparatus 20 shown in FIG. 15, it is possible to load the grip degree between the ground surface grounded on which the steered wheel is grounded and the steered wheel, which is estimated by the grip degree estimation arithmetically operating process 30*a*, on the basis of the grip degree loading process (S101), to determine whether or not the estimated grip degree ϵ is less than the predetermined grip degree ϵ' on the basis of the grip degree determining process (S103), and to notify the driver of the matter that the grip degree of the steered wheel is close to the limit on the basis of the grip limit notifying process (S105), in the case that the estimated grip degree ϵ is the predetermined grip degree ϵ' (Yes in S103). Accordingly, the driver can know the high probability that the side slip or the like of the vehicle is generated. Therefore, there is an effect that the stability of the vehicle behavior can be improved without applying any fear of insecurity to the driver.

What is claimed is:

1. A steering apparatus provided with a motor generating an assist force for assisting for a steering force on the basis of a steering torque generated in a steering shaft, comprising:
    a steering force index detecting means for detecting at least one steering force index among steering indexes including a steering torque and a steering force applied to a steering system from a steering wheel of a vehicle to a suspension;
    a self-aligning torque estimating means for estimating a self-aligning torque generated in a front wheel of said vehicle on the basis of a detected signal of said steering force index detecting means;
    a vehicle state quantity detecting means for detecting a state quantity of said vehicle;
    a front wheel index estimating means for estimating at least one front wheel index among front wheel indexes including a side force with respect to the front wheel of said vehicle and a front wheel slip angle on the basis of a detected signal of said vehicle state quantity detecting means;
    a grip degree estimating means for estimating a grip degree with respect to at least the front wheel of said vehicle on the basis of a change of the self-aligning torque estimated by said self-aligning torque estimating means, with respect to the front wheel index estimated by said front wheel index estimating means;
    a determining means for determining whether or not the grip degree estimated by said grip degree estimating means is less than a predetermined value; and
    a notifying means for notifying a driver of a fact that the grip degree of the front wheel of said vehicle is close to a limit, in the case that it is determined by said determining means that said estimated grip degree is less than the predetermined value,
    wherein the grip degree is indicative of a grip level of tire on a road surface in a vehicle-wheel lateral direction.

2. A steering apparatus as claimed in claim 1, wherein said notifying means is constituted by an increase of the assist force generated in said motor.

3. A steering apparatus as claimed in claim 1, wherein said notifying means is constituted by a decrease of the assist force generated in said motor.

4. A steering apparatus as claimed in claim 1, wherein said notifying means is constituted by a vibration of a drive current applied to said motor.

5. A steering apparatus provided with a motor generating an assist force for assisting for a steering force on the basis of a steering torque generated in a steering shaft, comprising:
 a steering force index detecting means for detecting at least one steering force index among steering indexes including a steering torque and a steering force applied to a steering system from a steering wheel of a vehicle to a suspension;
 a self-aligning torque estimating means for estimating a self-aligning torque generated in a front wheel of said vehicle on the basis of a detected signal of said steering force index detecting means;
 a vehicle state quantity detecting means for detecting a state quantity of said vehicle;
 a front wheel index estimating means for estimating at least one front wheel index among front wheel indexes including a side force with respect to the front wheel of said vehicle and a front wheel slip angle on the basis of a detected signal of said vehicle state quantity detecting means;
 a grip degree estimating means for estimating a grip degree with respect to at least the front wheel of said vehicle on the basis of a change of the self-aligning torque estimated by said self-aligning torque estimating means, with respect to the front wheel index estimated by said front wheel index estimating means;
 a determining means for determining whether or not the grip degree estimated by said grip degree estimating means is less than a predetermined value; and
 a notifying means for notifying a driver of a fact that the grip degree of the front wheel of said vehicle is close to a limit, in the case that it is determined by said determining means that said estimated grip degree is less than the predetermined value,
 wherein said notifying means is constituted by a vibration of a drive current applied to said motor.

* * * * *